Patented Aug. 24, 1948

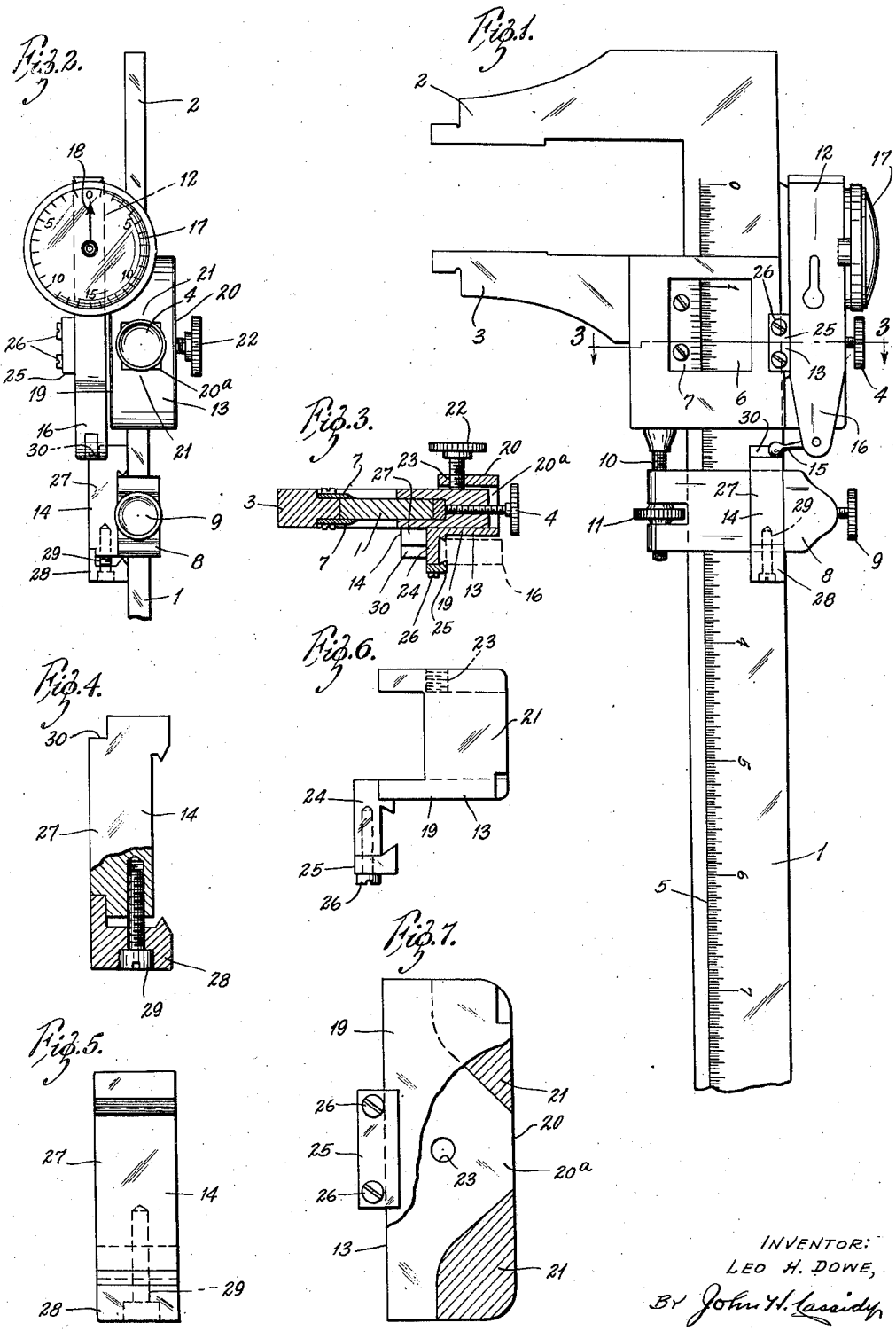

2,447,612

UNITED STATES PATENT OFFICE 2,447,612

DIAL INDICATOR MOUNT FOR SLIDE CALIPERS

Leo H. Dowe, St. Louis, Mo.

Application October 25, 1944, Serial No. 560,244

3 Claims. (Cl. 33—147)

This invention relates to gauges, of the nature of calipers and the like.

The object of this invention is to provide a caliper or similar gauge with an improvement or attachment so constructed and arranged that minor variations in a measurement may be read upon a dial. In present instruments of this nature a vernier scale is employed, but such a scale has its limitations, and can be read only with some difficulty and considerable patience. With the present invention variations in thousandths of an inch may be indicated accurately by a pointer on a dial and read instantly.

Another object of the invention is to provide attaching means in connection with a caliper or similar gauge whereby an accessory such as a standard or commercial dial gauge may be mounted on the movable jaw of the gauge in such a position that minute variations in the position of the movable jaw may be indicated by the dial gauge.

These advantages will be apparent from the following detail description of a preferred embodiment of the invention illustrated in the accompanying drawings in connection with a standard caliper.

Fig. 1 is a plan view of a caliper with the present improvement or attachment;

Fig. 2 is a top view;

Fig. 3 is a section on line 3—3, Fig. 1;

Fig. 4 is a plan view partly in section of an attached stop or abutment member;

Fig. 5 is a top plan view of the stop;

Fig. 6 is an end elevational view of a saddle for holding the dial indicator; and Fig. 7 is a side elevational view of the saddle.

Applicant's invention is intended to be associated with a caliper or similar instrument which has a sliding jaw connected to a sliding clamping member by a screw connection. The dial indicator employing an actuating element or lever is secured to the movable jaw with an actuating lever of the indicator engaging the clamping member. Thus variations in distance between the clamping member and the moving jaw may be read on the indicator.

A more detailed description of the device follows.

A caliper as illustrated is of familiar construction, and includes a stem 1 having integrally a fixed jaw 2. A sliding jaw 3 is slidably mounted on the stem to which it can be clamped by a thumb screw 4.

The stem has a scale 5 which may be read through a window 6 on the jaw member 3, while a cooperating vernier scale 7 is fixed on the jaw member 3.

A clamping member 8 is also slidably mounted on the stem 1, and has a thumb screw 9 by which it may be clamped to the stem 1. The clamping member 8 is connected to the movable jaw 3 by a micrometer adjusting screw 10, fixed to the jaw member 3, and a nut 11, on the screw 10, fixed with relation to the clamping member 8.

It will be understood that in using the caliper the thumb screws 4 and 9 will be loosened so that the movable jaw 3 and the clamping member 8 may be moved freely along the stem 1. It is often used by moving the jaw 3 until it occupies a selected approximate or intended position along the stem. Then the thumb screw 9 is tightened to fix the clamping member, and then minor adjustments in the position of the jaw 3 may be obtained by turning the thumb nut 11.

In accordance with this invention a dial indicator 12 is mounted on the movable jaw 3 by means of a novel saddle 13, while a suitable stop or abutment member 14 is fixed to the clamping member 8. The arrangement is such that the dial indicator 12 has its actuating lever 15 engaging the stop 14, so that any movement between the clamping member 8 and the movable jaw 3 will be registered on the dial indicator.

In the drawing there is shown a dial indicator of familiar commercial construction. It includes a housing 16, a dial 17, a pointer 18, and the actuating element or lever 15 which is connected with the pointer by a system of levers and gears. The arrangement is such that any movement of the actuating lever 15 will move the pointer 18 about the dial 17, either clockwise or counterclockwise, so that the magnitude of the movement may be read in thousandths of an inch, or other units depending upon the graduation of the dial.

The saddle 13 includes side plates 19 and 20 and spacing end members 21 so proportioned and arranged that the saddle may fit on the top or back of the sliding jaw member 3 with the side plates 19 and 20 spanning the member 3. The end members 21 are so spaced from each other that a space 20a is provided therebetween to accommodate at least the stem of the clamping screw 4. A thumb screw 22 threaded in a hole 23 through the plate 20 clamps the saddle on the movable jaw 3.

A base plate or longitudinal shelf 24 is fixed to one side of the saddle 13 on the plate 19 and provides a seat for the casing 16 of the dial indicator 12, which is secured thereon in a longitudinally adjustable position by a clamping bar 25, releasably held in clamping position by screws 26.

The stop or abutment member 14 comprises a block or jaw 27 and a block or jaw 28, clamped together by a screw 29, as shown in Figs. 1, 2, 4 and 5. The arrangement is such, as clearly shown in the drawing, that the stop 15 may be clamped to the side of the clamping member 8 by tightening the screw 29. An appropriate notch 30 is formed in the jaw 27 of the stop 14 to receive the actuating lever 15 of the dial indicator.

Particular devices of novel character have been described so that the invention may be applied to a standard caliper without any alterations of the caliper. It will be understood, of course, that the invention may be applied to a caliper by initially forming the movable jaw 3 and the clamping member 8 to hold the dial indicator 12 and form an abutting surface for its actuating lever.

It will also be understood that while the invention is described in connection with a particular form of caliper it may be applied to other instruments of like character which employ a movable jaw adjustable by a screw connection to an associated clamping member.

Various changes may be made in the details of construction, within the scope of the appended claims, without departing from this invention, and parts of the invention may be used without the whole.

I claim:

1. In a gauge having a stem, a jaw fixed to the stem, and a pair of members slidably mounted on the stem comprising a jaw and a clamping member connected together by an adjusting screw, the improvement comprising a removable saddle having a longitudinal shelf on one side thereof clamped to one of the sliding members, a clamping bar along the shelf, a dial indicator fixed on the shelf by said clamping bar and having an actuating element, the indicator being so positioned on and by the saddle that its actuating element engages the other sliding member, whereby variations in distance between said sliding members is registered on the dial of the indicator.

2. In a gauge having a stem, a jaw fixed to the stem, a movable jaw member encompassing and slidably mounted on the stem and a clamping screw threaded in the back of the movable jaw member to clamp said member on the stem, the improvement comprising a removable saddle member for carrying an accessory, adapted to fit on the back of said movable jaw member, said saddle member having a pair of slide plates and a pair of end members, the side plates being so positioned and arranged as to span said movable jaw member, the end members being spaced from each other to pass said clamping screw therebetween, a screw through one of the plates to engage the movable jaw member, a longitudinal shelf on the other plate to accommodate an accessory and a clamping bar along the shelf to hold said accessory in adjusted position on the shelf.

3. In a gauge having a stem, a jaw fixed to the stem, a movable jaw member encompassing and slidably mounted on the stem and a clamping screw threaded in the back of the movable jaw member to clamp said member on the stem, the improvement comprising a removable saddle member for carrying an accessory, adapted to fit on the back of said movable jaw member, said saddle member having a pair of side plates and a pair of end members, the side plates being so positioned and arranged as to span said movable jaw member, the end members being spaced from each other to pass said clamping screw therebetween, a screw through one of the plates to engage the movable jaw member, a support on the other plate having a longitudinal guide to accommodate an accessory, and a fastener for securing said accessory in adjusted position along said guide.

LEO H. DOWE.

REFERENCES CITED

The following references are of record in the file of this patent:

FOREIGN PATENTS

| Number | Country | Date |
|---|---|---|
| 523,795 | Great Britain | July 23, 1940 |
| 872,402 | France | Feb. 9, 1942 |